US012496828B2

(12) United States Patent
Katayama

(10) Patent No.: US 12,496,828 B2
(45) Date of Patent: Dec. 16, 2025

(54) CLEANING METHOD AND INKJET RECORDING APPARATUS

(71) Applicant: KYOCERA Document Solutions Inc., Osaka (JP)

(72) Inventor: Yosuke Katayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 123 days.

(21) Appl. No.: 18/523,362

(22) Filed: Nov. 29, 2023

(65) Prior Publication Data

US 2024/0198681 A1 Jun. 20, 2024

(30) Foreign Application Priority Data

Nov. 30, 2022 (JP) ................................ 2022-190907

(51) Int. Cl.

| | |
|---|---|
| ***B41J 2/165*** | (2006.01) |
| *C11D 1/90* | (2006.01) |
| *C11D 1/94* | (2006.01) |
| *C11D 3/43* | (2006.01) |

(52) U.S. Cl.

CPC ....... *B41J 2/16538* (2013.01); *B41J 2/16535* (2013.01); *B41J 2/16552* (2013.01); *B41J 2/16585* (2013.01); *B41J 2002/16558* (2013.01); *B41J 2002/16591* (2013.01); *C11D 1/90* (2013.01); *C11D 1/94* (2013.01); *C11D 3/43* (2013.01); *C11D 2111/20* (2024.01)

(58) Field of Classification Search

CPC ................ B41J 2/16538; B41J 2/16535; B41J 2/16552; B41J 2/16585; B41J 2002/16558; B41J 2002/16591; C11D 1/90; C11D 1/94; C11D 3/43; C11D 2111/20

See application file for complete search history.

(56) References Cited

FOREIGN PATENT DOCUMENTS

| | | | | |
|---|---|---|---|---|
| JP | 2016-032930 A | | 3/2016 | |
| JP | 2021030482 | * | 3/2021 | ............. B41J 2/165 |

* cited by examiner

*Primary Examiner* — Geoffrey S Mruk

(74) *Attorney, Agent, or Firm* — Studebaker Brackett PLLC

(57) ABSTRACT

A cleaning method is a method of cleaning a recording head that has an ink-ejecting surface and ejects ink from the ink-ejecting surface. The cleaning method includes supplying a cleaning liquid to the ink-ejecting surface of the recording head, and wiping the ink-ejecting surface of the recording head twice with a wipe blade after the supplying a cleaning liquid. A first wiping speed in the wiping is 5 mm/sec or more and 25 mm/sec or less. A second wiping speed in the wiping is 45 mm/sec or more and 100 mm/sec or less. The cleaning liquid contains water, a water-soluble organic solvent, an amphoteric surfactant having a betaine structure, and a silicone surfactant. The viscosity of the cleaning liquid is 1.0 mPa·s or more and 3.1 mPa·s or less. The static surface tension of the cleaning liquid is 10 mN/m or more and 25 mN/m or less.

8 Claims, 4 Drawing Sheets

CLEANING METHOD AND INKJET RECORDING APPARATUS

INCORPORATION BY REFERENCE

The present application claims priority under 35 U.S.C. § 119 to Japanese Patent Application No. 2022-190907, filed on Nov. 30, 2022. The contents of this application are incorporated herein by reference in their entirety.

BACKGROUND

The present disclosure relates to a cleaning method and an inkjet recording apparatus.

An inkjet recording apparatus is desired to include a recording head whose ejection performance be stable over a long period of time (in excellent ejection stability). Maintaining the ejection performance of the recording head requires cleaning the ink-ejecting surface of the recording head at a certain frequency. Examples of known methods of cleaning a recording head include a method of supplying a cleaning liquid to an ink-ejecting surface of a recording head and then wiping the ink-ejecting surface of the recording head with a wipe blade.

Inks to be used in inkjet recording apparatuses may contain a resin component (dispersion resin or binder resin, mixed with pigment) from the viewpoint of ensuring the stability of pigment dispersion and from the viewpoint of reliable fixation of pigments on recording media. Forming images using inks containing resin components may cause resin components to adhere to the ink-ejecting surfaces of recording heads, thereby resulting in a decrease in the ejection performance of the recording heads. The resin components strongly adhere to the ink-ejecting surfaces of the recording heads, and are therefore difficult to be removed by using known cleaning methods. Cleaning methods with excellent cleaning performance that can effectively remove the above-mentioned resin components have therefore been studied.

Examples of cleaning methods with excellent cleaning performance include a first method in which a cleaning liquid containing a highly hydrophobic organic solvent is used, and a second method in which wiping is repeated many times by increasing the number of times of wiping. The first method may however cause a resin member constituting a recording head to be gradually denatured by the organic solvent, whereby the ejection performance of the recording head may deteriorate over a long period of time. The second method may cause the ink-ejecting surface of a recording head to be gradually worn out due to repeated wiping, whereby the ejection performance of the recording head may deteriorate over a long period of time. Still another cleaning method with excellent cleaning performance has therefore been proposed in which a wipe blade that is a porous member and a wipe blade that is an elastic member are used and respective moving speeds of the wipe blades are adjusted.

SUMMARY

A cleaning method according to the present disclosure is a method of cleaning a recording head that includes an ink-ejecting surface and ejects ink from the ink-ejecting surface. The cleaning method includes supplying a cleaning liquid to the ink-ejecting surface of the recording head, and wiping the ink-ejecting surface of the recording head twice with a wipe blade after the supplying a cleaning liquid. A first wiping speed in the wiping is 5 mm/sec or more and 25 mm/sec or less. A second wiping speed in the wiping is 45 mm/sec or more and 100 mm/sec or less. The cleaning liquid contains water, a water-soluble organic solvent, an amphoteric surfactant having a betaine structure, and a silicone surfactant. The viscosity of the cleaning liquid is 1.0 mPa·s or more and 3.1 mPa·s or less. The static surface tension of the cleaning liquid is 10 mN/m or more and 25 mN/m or less.

An inkjet recording apparatus according to the present disclosure includes a cleaning liquid, a recording head that includes an ink-ejecting surface and ejects ink from the ink-ejecting surface, a cleaning-liquid-supplying section, and a wipe blade. The cleaning liquid contains water, a water-soluble organic solvent, an amphoteric surfactant having a betaine structure, and a silicone surfactant. The viscosity of the cleaning liquid is 1.0 mPa·s or more and 3.1 mPa·s or less. The static surface tension of the cleaning liquid is 10 mN/m or more and 25 mN/m or less. The cleaning-liquid-supplying section supplies the cleaning liquid to the ink-ejecting surface of the recording head. The wipe blade performs a wipe operation of wiping twice the ink-ejecting surface of the recording head to which the cleaning liquid has been supplied. A first wiping speed in the wipe operation is 5 mm/sec or more and 25 mm/sec or less. The second wiping speed in the wipe operation is 45 mm/sec or more and 100 mm/sec or less.

DETAILED DESCRIPTION

Figure 1:
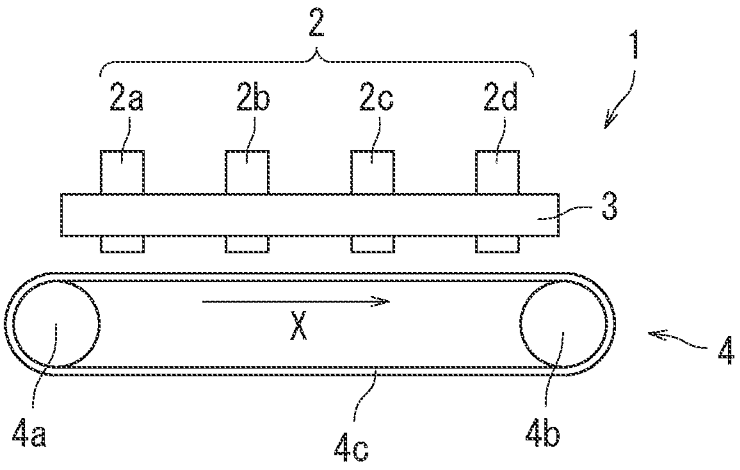
FIG. 1 is a diagram depicting an example of a main part of an inkjet recording apparatus that performs a cleaning method according to a first embodiment of the present disclosure.

Embodiments of the present disclosure will be described below. Note that static surface tension is a value measured at 25° C. according to the Wilhelmy plate method, using a surface tension meter (e.g., "Automatic surface tension meter DY-300" manufactured by Kyowa Interface Science Co., Ltd). Viscosity is a value measured at 25° C. according to the method described in JIS (Japanese Industrial Standards) Z8803:2011 "Liquid viscosity measuring method", using a falling ball automatic micro-viscosity meter (e.g., "AMVn" manufactured by Anton Paar GmbH). In the specification, acrylic and methacrylic may be collectively referred to as "(meth)acrylic". Each component described in the specification may be used alone or in combination of two or more.

First Embodiment: Cleaning Method

Hereinafter, a cleaning method according to a first embodiment of the present disclosure will be described. The cleaning method according to the present disclosure is a method of cleaning a recording head that includes an ink-ejecting surface and ejects ink from the ink-ejecting surface. The cleaning method includes a cleaning-liquid-supplying step of supplying a cleaning liquid to the ink-ejecting surface of the recording head and a wiping step of wiping the ink-ejecting surface of the recording head twice with a wipe blade after the cleaning-liquid-supplying step. A first wiping speed in the wiping step is 5 mm/sec or more and 25 mm/sec or less. A second wiping speed in the wiping step is 45 mm/sec or more and 100 mm/sec or less. The cleaning liquid contains water, a water-soluble organic solvent, an amphoteric surfactant having a betaine structure, and a silicone surfactant. The viscosity of the cleaning liquid is 1.0 mPa·s or more and 3.1 mPa·s or less. The static surface tension of the cleaning liquid is 10 mN/m or more and 25 mN/m or less.

Preferably, the cleaning method according to the present embodiment further includes a preliminary wiping step of wiping the ink-ejecting surface of the recording head with the wipe blade before the cleaning-liquid-supplying step. The wiping speed in the preliminary wiping step can be similar to the second wiping speed in the wiping step. Specifically, the wiping speed in the preliminary wiping step is preferably 45 mm/sec or more and 100 mm/sec or less.

The cleaning method according to the present embodiment is suitable, for example, as a method of cleaning an ink-ejecting surface of a recording head in an inkjet recording apparatus. The recording head may be of a line type or a serial type.

The cleaning method according to the present embodiment is preferably used for cleaning recording heads that eject an aqueous ink containing a resin component (e.g., dispersion resin or binder resin, mixed with pigment). Examples of the resin component include (meth)acrylic resin, styrene-(meth)acrylic resin, urethane resin, polyester resin, and olefin resin. A ratio of resin component content to the aqueous ink is, for example, 0.1% by mass or more and 5.0% by mass or less.

The cleaning method according to the present embodiment includes the above-described steps, thereby making it possible to suppress the influence on the ejection performance of the recording heads while exhibiting excellent cleaning performance. The reason is inferred as follows. The cleaning liquid to be used in the cleaning method according to the present embodiment contains the amphoteric surfactant having the betaine structure and the silicone surfactant. Amphoteric surfactants with a betaine structure are excellent in the ability to adhere to the area around dirt (pigment, resin component, etc.) adhering to an object to be cleaned (ink-ejecting surface) to release the dirt from the object to be cleaned, and the ability to disperse the released dirt in the cleaning liquid. In addition, silicone surfactants lower the surface tension of a cleaning liquid, causing the cleaning liquid to easily penetrate dirt. In this way, the cleaning liquid contains two types of surfactants and are in excellent cleaning performance.

The cleaning method according to the present embodiment also includes wiping the ink-ejecting surface twice in the wiping step after the cleaning-liquid-supplying step is performed. The first wiping includes wiping the ink-ejecting surface together with the cleaning liquid with ink present on the ink-ejecting surface. At this time, the first wiping is performed at a relatively low speed (5 mm/sec or more and 25 mm/sec or less). Therefore, the cleaning liquid adhering to the ink-ejecting surface cannot be completely removed, and cleaning liquid remains partially without being wiped. As a result, after the first wiping, a liquid film is formed on the ink-ejecting surface by the remaining cleaning liquid. The cleaning liquid has a low viscosity and static surface tension so that it can easily form such a liquid film. The cleaning liquid forming the liquid film gradually penetrates the dirt (pigment, resin component, etc.) adhering to the ink-ejecting surface until the second wiping, and releases the dirt from the ink-ejecting surface. The second wiping is then performed at a relatively high speed (45 mm/sec or more and 100 mm/sec or less). Thereby, the cleaning liquid remaining on the ink-ejecting surface can be completely wiped away along with the dirt. As described above, the cleaning method according to the present embodiment can exhibit excellent cleaning performance by performing the first wiping at a relatively low speed to intentionally cause the cleaning liquid to remain partially without being wiped. The cleaning method according to the present embodiment can also suppress the influence on the ejection performance of the recording head by performing the second wiping at a relatively high speed to prevent the cleaning liquid from remaining without being wiped on the ink-ejecting surface. Furthermore, the composition and physical properties of the cleaning liquid are adjusted so that the effect of such two wiping can be maximized. As a result, the cleaning method according to the present embodiment can suppress the influence on the ejection performance of the recording head while exhibiting excellent cleaning performance. The details of the cleaning method according to the present embodiment will be described below.

Hereinafter, a cleaning method according to the present embodiment will be described with reference to the drawings. The drawings mainly illustrate the constituent elements schematically to facilitate understanding thereof. Aspects such as size and number of the constituent elements illustrated in the drawings may be altered as appropriate.

[Inkjet Recording Apparatus]

FIG. 1 is a diagram depicting an example of a main part of an inkjet recording apparatus that performs a cleaning method according to the present embodiment. An inkjet recording apparatus 1 depicted in FIG. 1 includes an image forming section 2, a head housing 3 that holds the image forming section 2, a conveyance unit 4 that conveys a recording medium (not illustrated), a cleaning-liquid-supplying section 6 (not illustrated in FIG. 1), and a wipe blade (not illustrated in FIG. 1). The image forming section 2 includes a first recording head 2*a*, a second recording head 2*b*, a third recording head 2*c*, and a fourth recording head 2*d*. The conveyance unit 4 includes first and second rollers 4*a* and 4*b* that are a pair of conveyance rollers, and a conveyance belt 4*c* stretched between the first and second rollers 4*a* and 4*b*. The conveyance unit 4 conveys a recording medium placed on the conveyance belt 4*c* in a conveyance direction X (rightward in FIG. 1). The first, second, third, and fourth recording heads 2*a*, 2*b*, 2*c*, and 2*d* eject their respective inks to form an image when the recording medium is conveyed directly below.

The first, second, third, and fourth recording heads 2*a*, 2*b*, 2*c*, and 2*d* eject their respective different color inks (e.g., black, cyan, magenta, and yellow inks).

Preferable examples of the recording medium include a poorly absorbent recording medium such as coated paper and a non-absorbent recording medium such as a resin film. Ink to be used for forming images on poorly absorbent recording media and non-absorbent recording media may contain a resin component in order to ensure the fixability of pigments to the recording media. The inkjet recording apparatus 1 uses ink containing a resin component, so that dirt by the resin component easily occurs in each recording head 2. The cleaning method according to the present embodiment is in excellent cleaning performance, and therefore the dirt by the resin component on each recording head 2 can be effectively removed. From the above, the cleaning method according to the present embodiment is suitable for cleaning the inkjet recording apparatus 1 that uses a poorly absorbent recording media and a non-absorbent recording media as recording media.

Figure 2:
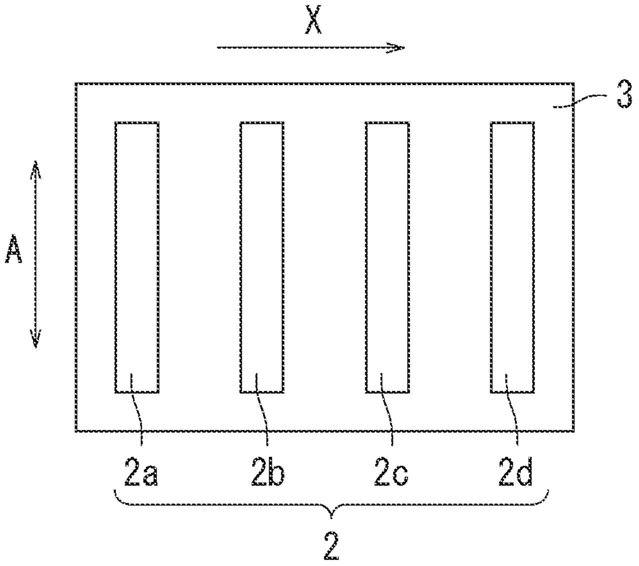
FIG. 2 is a diagram depicting the lower surface of an image forming section and a head housing in FIG. 1.

FIG. 2 is a diagram depicting the lower surface of the image forming section 2 and the head housing 3 in FIG. 1. The first, second, third, and fourth recording heads 2*a*, 2*b*, 2*c*, and 2*d* are of a line type and extend in a direction perpendicular to the conveyance direction X. Hereinafter, the direction perpendicular to the conveyance direction X may be referred to as a width direction A.

The first, second, third, and fourth recording heads 2*a*, 2*b*, 2*c*, and 2*d* have almost the same configuration except that their respective inks to be ejected are different in color. The details of each recording head will be described below, taking the first recording head 2*a* as an example.

Figure 3:
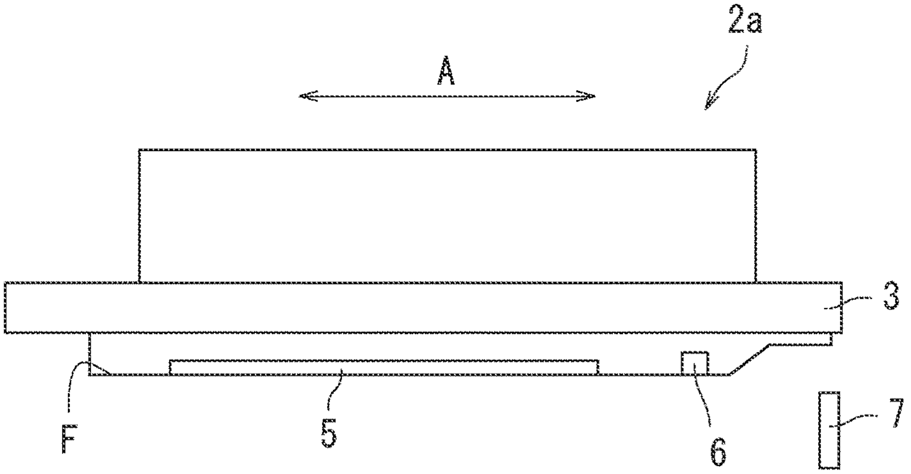
FIG. 3 is a side view of a first recording head in FIG. 1.

FIG. 3 is a side view of the first recording head 2*a* in FIG. 1. The first recording head 2*a* includes a recording section 5 that ejects ink, and the cleaning-liquid-supplying section 6 that supplies an ink-ejecting surface F with a cleaning liquid C to be described later. The cleaning-liquid-supplying section 6 is placed near the recording section 5 in the ink-ejecting surface F. The wipe blade 7 included in the inkjet recording apparatus 1 is placed near the first recording head 2*a*. The wipe blade 7 possesses a function of wiping the ink-ejecting surface F in a predetermined direction. The predetermined direction is a left direction in FIG. 3 and is hereinafter referred to as a wiping direction W. The wipe blade 7 is, for example, a rubber wiper. The wipe blade 7 has a linear pressure that is, for example, 5 N/m or more and 20 N/m or less.

Each of the second, third, and fourth recording heads 2*b*, 2*c*, and 2*d* also includes a recording section 5 that ejects ink, and a cleaning-liquid-supplying section 6 that supplies a cleaning liquid C to an ink-ejecting surface F of the recording section 5, like the first recording head 2*a*. Another wipe blade 7 included in the inkjet recording apparatus 1 is also provided near each of the second, third, and fourth recording heads 2*b*, 2*c*, and 2*d*.

The inkjet recording apparatus 1 has been described above with reference to the drawings. However, an inkjet recording apparatus used in a cleaning method according to the present embodiment can be changed as appropriate and is not limited to the inkjet recording apparatus 1 depicted in FIG. 1. For example, in the inkjet recording apparatus used in the cleaning method, members other than the recording heads, the cleaning-liquid-supplying sections, and the wipe blades are options and can be omitted. The inkjet recording apparatus may also include one to three or five or more recording heads. The inkjet recording apparatus may be of a serial type.

Figure 4:
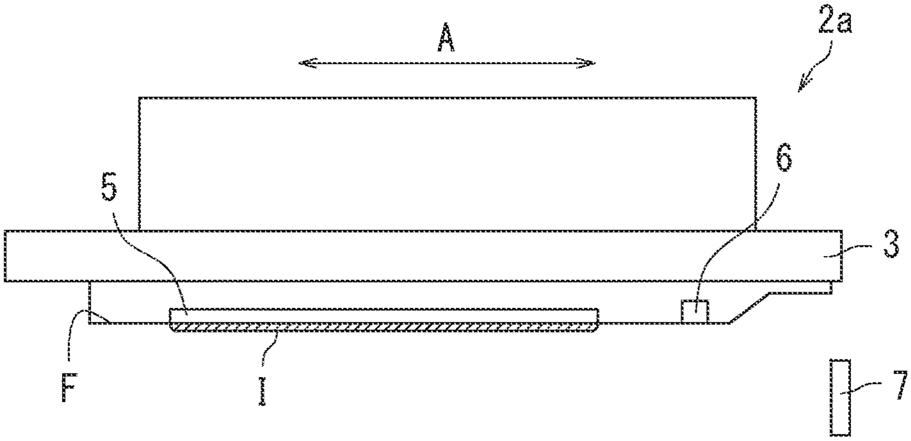
FIG. 4 is a diagram depicting the state of the recording head before the cleaning method is performed.

A series of steps of the cleaning method according to the present embodiment will be described with reference to FIGS. 4 to 11. FIG. 4 depicts the state of the first recording head 2*a* before the cleaning method according to the present embodiment is performed (immediately after image formation). Ink I adheres to the recording section 5 of the first recording head 2*a* due to the image formation.

[Preliminary Wiping Step]

Figure 5:
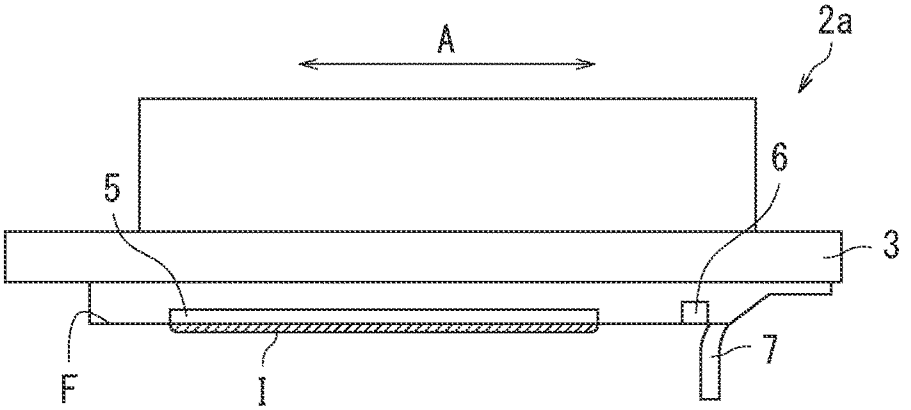
FIG. 5 is a diagram depicting the next state from that in FIG. 4.
Figure 6:
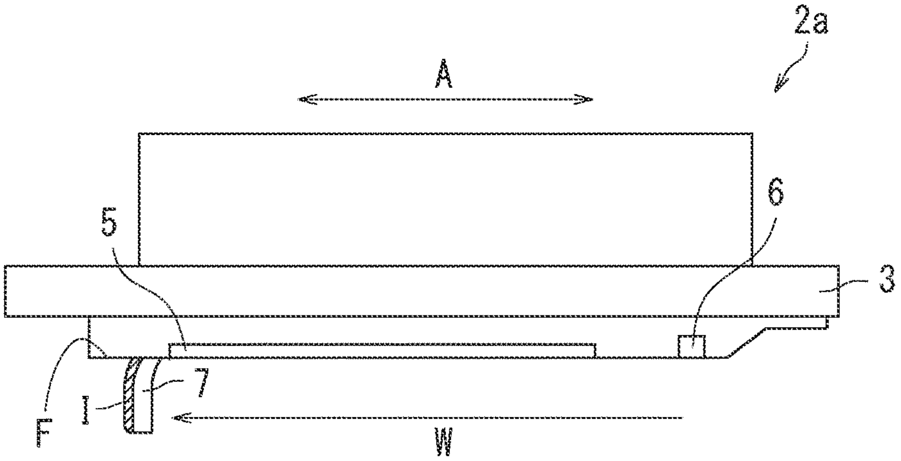
FIG. 6 is a diagram depicting the next state from that in FIG. 5.

FIGS. 5 and 6 depict a preliminary wiping step. The preliminary wiping step is usually the first step of the cleaning method according to the present embodiment. The preliminary wiping step includes wiping the ink-ejecting surface F of the recording head 2 (first recording head 2*a* in FIGS. 5 and 6) with the wipe blade 7 before the cleaning-liquid-supplying step.

The wiping speed in the preliminary wiping step is preferably 45 mm/sec or more and 100 mm/sec or less, more preferably 45 mm/sec or more and 70 mm/sec or less, and even more preferably 47 mm/sec or more and 55 mm/sec or less. Setting the wiping speed in the preliminary wiping step to 45 mm/sec or more enables the cleaning method according to the present embodiment to prevent the ink I from remaining partially without being wiped on the ink-ejecting surface F. Setting the wiping speed in the preliminary wiping step to 100 mm/sec or less enables the cleaning method according to the present embodiment to prevent the ink-ejecting surface F of the recording head 2 from being worn even when the ink-ejecting surface F is coated with a water repellent coating, etc.

The preliminary wiping step includes wiping the ink-ejecting surface F of the first recording head 2*a*, with the wipe blade 7, in the wiping direction W as depicted in FIGS. 5 and 6. As a result, the ink I adhering to the recording section 5 of the first recording head 2*a* is removed. However, for the preliminary wiping step, it is difficult to remove the resin component (not illustrated) adhering to the recording section 5 of the first recording head 2*a*, so that the resin component remains in the recording section 5. Note that the preliminary wiping step includes normally wiping once but may include wiping two or more times.

[Cleaning-Liquid-Supplying Step]

Figure 7:
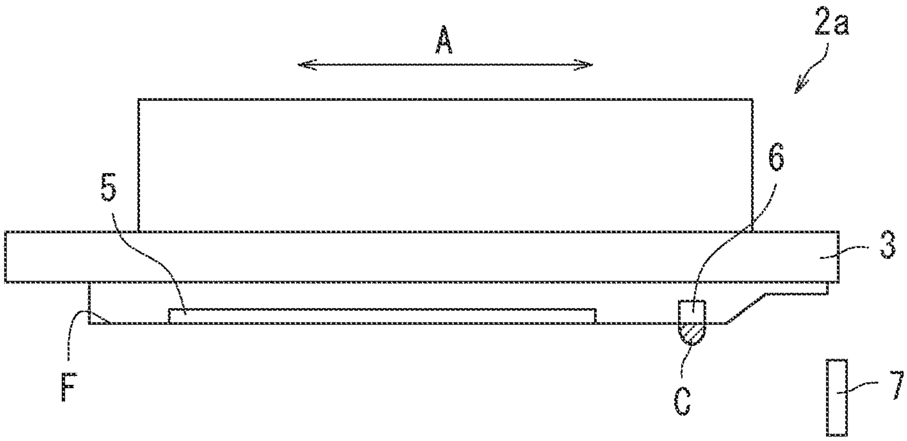
FIG. 7 is a diagram depicting the next state from that in FIG. 6.

FIG. 7 depicts a cleaning-liquid-supplying step. The cleaning-liquid-supplying step includes that the cleaning-liquid-supplying section 6 supplies a cleaning liquid C to the ink-ejecting surface F of the recording head 2 (first recording head 2*a* in FIG. 7). Specifically, the cleaning-liquid-supplying section 6 supplies the cleaning liquid C to a portion which is on the ink-ejecting surface F of the first recording head 2*a* and which is upstream of the recording section 5 in the wiping direction W as reference. The cleaning liquid C supplied adheres to the lower part of the cleaning-liquid-supplying section 6 to form a meniscus.

In the present step, the supply amount of the cleaning liquid is preferably 0.5 $\mu L/cm^2$ or more and 10.0 $\mu L/cm^2$ or less, more preferably 1.5 $\mu L/cm^2$ or more and 4.0 $\mu L/cm^2$ or less. Setting the supply amount of the cleaning liquid to 0.5 $\mu L/cm^2$ or more enables the cleaning method according to the present embodiment to exhibit even more excellent cleaning performance. Setting the supply amount of the cleaning liquid to 10.0 $\mu L/cm^2$ or less enables the cleaning method according to the present embodiment to further reliably suppress the influence on the ejection performance of the recording head.

[Wiping Step]

FIGS. 8 to 11 depict a wiping step. The wiping step includes wiping twice the ink-ejecting surface F of the recording head 2 (first recording head 2*a* in FIGS. 8 to 11) with the wipe blade 7.

(First Wiping)

Figure 8:
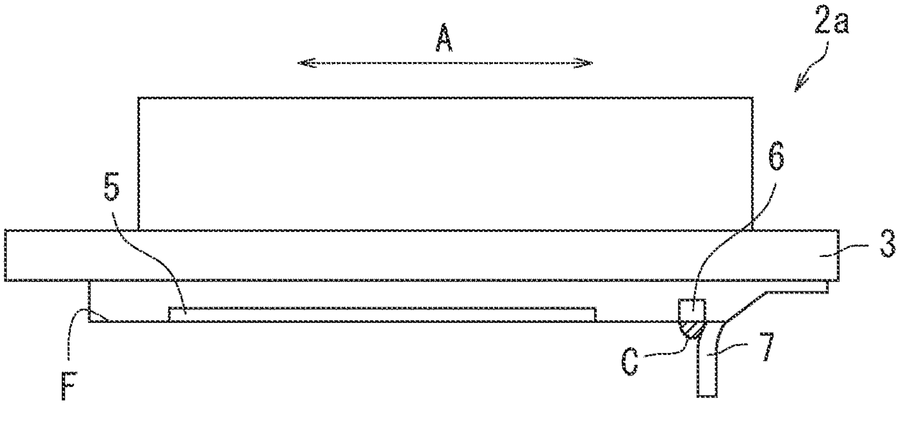
FIG. 8 is a diagram depicting the next state from that in FIG. 7.
Figure 9:
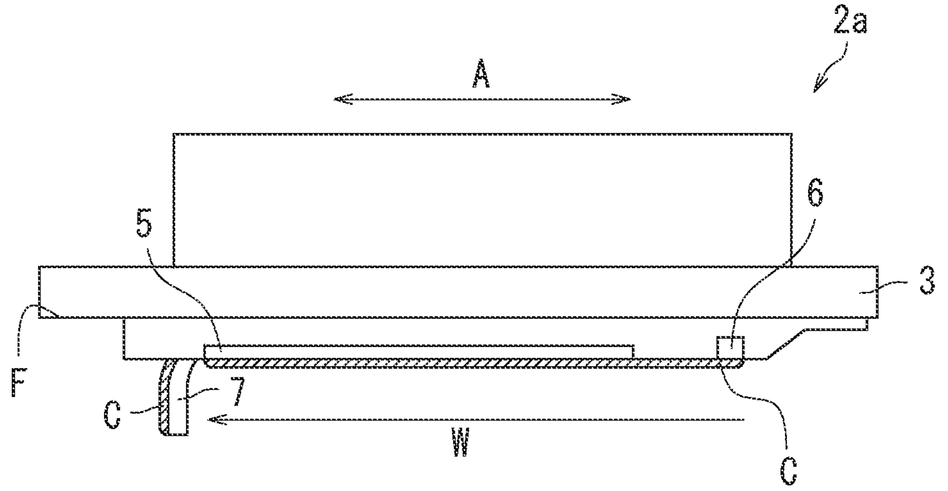
FIG. 9 is a diagram depicting the next state from that in FIG. 8.

The first wiping includes wiping the ink-ejecting surface F of the first recording head 2*a*, with the wipe blade 7, in the wiping direction W as depicted in FIGS. 8 and 9. The cleaning liquid C adheres to the wipe blade 7 while the wipe blade 7 is passing through the lower part of the cleaning-liquid-supplying section 6. The cleaning liquid C moves on the ink-ejecting surface F along with the wiping operation of the wipe blade 7 while adhering to the wipe blade 7. Here, the cleaning liquid C has low surface tension and low viscosity, and the wiping speed of the wipe blade 7 during the first wiping is relatively low. Therefore, a part of the cleaning liquid C moving on the ink-ejecting surface F together with the wipe blade 7 remains on the ink-ejecting surface F. That is, in the first wiping, the cleaning liquid C is intentionally remained partially without being wiped. A liquid film is consequently formed by the cleaning liquid C on the ink-ejecting surface F of the first recording head 2*a* after the first wiping as depicted in FIG. 9. The liquid film of the cleaning liquid C continues to exhibit, until second wiping is performed, the function of releasing the resin component adhering to the recording section 5 from the ink-ejecting surface F and dispersing the resin component in the cleaning liquid C.

The first wiping speed is preferably 5 mm/sec or more and 25 mm/sec or less, more preferably 15 mm/sec or more and 22 mm/sec or less. Setting the first wiping speed to 5 mm/sec or more enables the cleaning method according to the present embodiment to perform cleaning at a practical speed. Setting the first wiping speed to 25 mm/sec or less enables the cleaning method according to the present embodiment to intentionally cause the cleaning liquid C to remain partially without being wiped on the ink-ejecting surface F. The cleaning method according to the present embodiment can consequently exhibit excellent cleaning performance.

(Second Wiping)

Figure 10:
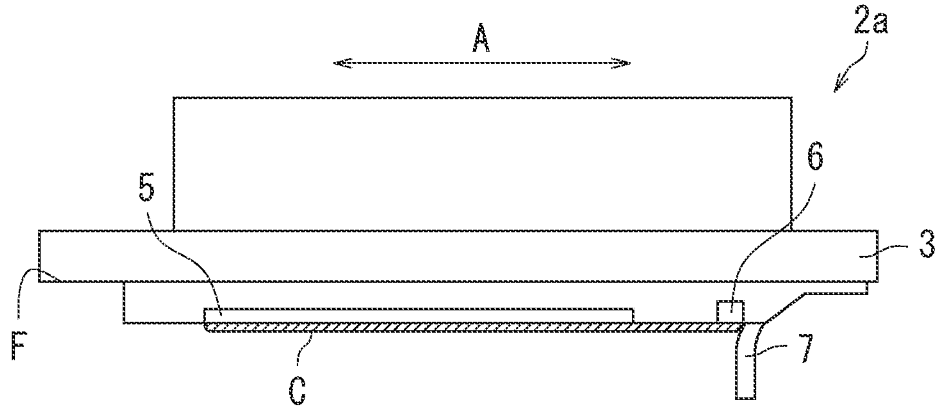
FIG. 10 is a diagram depicting the next state from that in FIG. 9.
Figure 11:
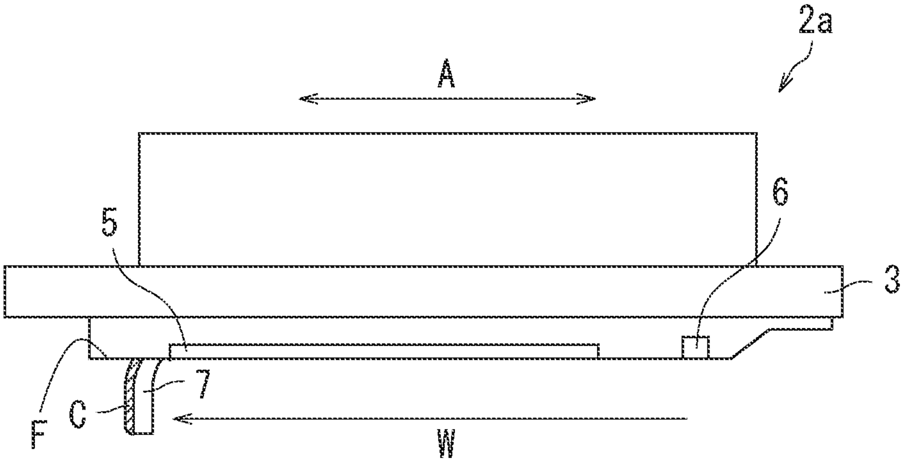
FIG. 11 is a diagram depicting the next state from that in FIG. 10.

The second wiping includes wiping the ink-ejecting surface F of the first recording head 2*a*, with the wipe blade 7, in the wiping direction W as depicted in FIGS. 10 and 11. The wipe blade 7 removes, together with the above-mentioned resin component, the cleaning liquid C remaining on the ink-ejecting surface F. The second wiping speed is relatively high, and therefore the wipe blade 7 reliably removes the cleaning liquid C so that the cleaning liquid C is prevented from remaining partially without being unwiped. As a result, the ink-ejecting surface F of the first recording head 2*a* after the second wiping is in a state where both the ink I and the cleaning liquid C have been removed (cleaning has been completed) as depicted in FIG. 11.

The second wiping speed is preferably 45 mm/sec or more and 100 mm/sec or less, more preferably 45 mm/sec or more and 70 mm/sec or less, and even more preferably 47 mm/sec or more and 55 mm/sec or less. Setting the second wiping speed to 45 mm/sec or more enables the cleaning method according to the present embodiment to prevent the cleaning liquid C from remaining partially without being wiped on the ink-ejecting surface F after the second wiping. The cleaning method according to the present embodiment can consequently suppress the influence of the cleaning liquid C remaining partially without being wiped on the ejection performance of the recording head 2. Setting the second wiping speed to 100 mm/sec or less enables the cleaning method according to the present embodiment to prevent the ink-ejecting surface F from wearing when the ink-ejecting surface F of the recording head 2 is coated with a water repellent coating or the like.

The cleaning method according to the present embodiment has been described above with reference to the drawings. However, the cleaning method according to the present embodiment can be changed as appropriate and is not limited to those depicted in FIGS. 4 to 11. For example, as described above, the preliminary wiping step can be omitted in the cleaning method according to the present embodiment. The cleaning method of the present disclosure may further include a different step other than the preliminary wiping step, the cleaning-liquid-supplying step, and the wiping step. In the cleaning-liquid-supplying step depicted in FIG. 7, the cleaning liquid C is supplied to a portion which is on the ink-ejecting surface F of the first recording head 2*a* and which is upstream of the recording section 5. The cleaning method according to the present embodiment may however include a cleaning-liquid-supplying step of supplying a cleaning liquid C to the other parts of the ink-ejecting surface F or all parts of the ink-ejecting surface F. The cleaning method according to the present embodiment may also include a cleaning-liquid-supplying step of supplying a cleaning liquid C to the ink-ejecting surface F by a method such as spray coating. Details of the cleaning liquid to be used in the cleaning method according to the present embodiment will be described below.

[Cleaning Liquid]

The cleaning liquid contains water, a water-soluble organic solvent, an amphoteric surfactant having a betaine structure, and a silicone surfactant.

The viscosity of the cleaning liquid is preferably 1.0 mPa·s or more and 3.1 mPa·s or less, and more preferably 1.5 mPa·s or more and 2.3 mPa·s or less. Setting the viscosity of the cleaning liquid to 1.0 mPa·s or more and 3.1 mPa·s or less enables the cleaning method according to the present embodiment to exhibit excellent cleaning performance.

The static surface tension of the cleaning liquid is preferably 10 mN/m or more and 25 mN/m or less, and more preferably 20 mN/m or more and 25 mN/m or less. Setting the static surface tension of the cleaning liquid to 10 mN/m or more and 25 mN/m or less enables the cleaning method according to the present embodiment to exhibit excellent cleaning performance.

(Water)

A ratio of water content to the cleaning liquid is preferably 40.0% by mass or more and 90.0% by mass or less, and more preferably 60.0% by mass or more and 80.0% by mass or less.

(Water-Soluble Organic Solvent)

The water-soluble organic solvent serves to adjust the viscosity and static surface tension of the cleaning solution. Examples of the water-soluble organic solvent include polyhydric alcohol, glycol ether, lactam compound, nitrogen-containing compound, acetate compound, thiodiglycol, and dimethyl sulfoxide.

Examples of the polyhydric alcohol include glycol compound and glycerin. Examples of the glycol compound include: ethylene glycol; 1,3-propanediol; propylene glycol; 1,2-pentanediol; 1,5-pentanediol; 1,2-octanediol; 1,8-octanediol; 3-methyl-1,3-butanediol; 3-methyl-1,5-pentanediol; diethylene glycol; triethylene glycol; and tetraethylene glycol.

Examples of the glycol ether include: diethylene glycol diethyl ether; diethylene glycol monobutyl ether; ethylene glycol monomethyl ether; ethylene glycol monobutyl ether; diethylene glycol monomethyl ether; diethylene glycol monoethyl ether; diethylene glycol diethyl ether, triethylene glycol monomethyl ether; triethylene glycol monoethyl ether; triethylene glycol monobutyl ether; and propylene glycol monomethyl ether.

Examples of the lactam compound include 2-pyrrolidone and N-methyl-2-pyrrolidone.

Examples of the nitrogen-containing compound include 1,3-dimethylimidazolidinone, formamide, and dimethylformamide.

Examples of the acetate compound include diethylene glycol monoethyl ether acetate.

The water-soluble organic solvent is preferably polyhydric alcohol, and more preferably glycerin, propylene glycol or 1,3-propanediol from the viewpoint of adjusting the viscosity and static surface tension of the cleaning liquid.

A ratio of water-soluble organic solvent content to the cleaning liquid is preferably 10.0% by mass or more and 35.0% by mass or less, and more preferably 15.0% by mass or more and 25.0% by mass or less. Setting the ratio of the water-soluble organic solvent content to 10.0% by mass or more and 35.0% by mass or less makes it possible to easily impart appropriate viscosity and static surface tension to the cleaning liquid.

(Amphoteric Surfactant Having Betaine Structure)

The amphoteric surfactant having the betaine structure imparts excellent cleaning performance to a cleaning liquid. Note that betaine refers to an inner salt that includes, in one molecule, a cationic structure (e.g., a quaternary ammonium ion structure) and an anionic structure (e.g., an anionic structure of an acid such as a carboxylic acid). The amphoteric surfactant having the betaine structure is preferably an amphoteric surfactant having an amidoalkyl betaine structure. The amphoteric surfactant having the amidoalkyl betaine structure is preferably a compound represented by General Formula (1) below.

[General Formula ]

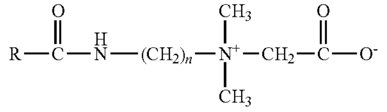

(1)

In General Formula (1), R represents a monovalent chain hydrocarbon group having 6 or more and 20 or less carbon atoms and n represents an integer of 1 or more and 5 or less.

R preferably represents a monovalent chain hydrocarbon group having 10 or more and 18 or less carbon atoms. Examples of the monovalent chain hydrocarbon group represented by R include a chain alkyl group and a chain alkenyl group. Preferably, n represents 3.

The amphoteric surfactant having the amidoalkyl betaine structure is, for example a fatty acid amidopropyl betaine surfactant. Examples of the fatty acid amidopropyl betaine surfactant include coconut oil fatty acid amidopropyl betaine, lauric acid amidopropyl betaine, palm kernel fatty acid amidopropyl betaine, isostearate amidopropyl betaine, and linoleic acid amidopropyl betaine. Preferable examples of the amphoteric surfactant having the amidoalkyl betaine structure include coconut oil fatty acid amidopropyl betaine, lauric acid amidopropyl betaine, and palm kernel fatty acid amidopropyl betaine.

A ratio of content of amphoteric surfactant having the betaine structure to the cleaning liquid is preferably 0.3% by mass or more and 3.0% by mass or less, and more preferably 1.7% by mass or more and 2.5% by mass or less. Excellent cleaning performance can be imparted to the cleaning liquid by setting, to 0.3% by mass or more and 3.0% by mass or less, the ratio of the content of the amphoteric surfactant having the betaine structure to the cleaning liquid.

(Silicone Surfactant)

The silicone surfactant serves to adjust the surface tension of the cleaning liquid. The silicone surfactant means a surfactant with siloxane bonds. The silicone surfactant is preferably a polyether-modified silicone surfactant and more preferably polyether-modified polydimethylsiloxane.

A ratio of silicone surfactant content to the cleaning liquid is preferably 0.05% by mass or more and 1.5% by mass or less, and more preferably 0.2% by mass or more and 0.8% by mass or less. Appropriate surface tension can be easily imparted to the cleaning liquid by setting the ratio of the silicone surfactant content to 0.05% by mass or more and 1.5% by mass or less.

It is preferable that the cleaning liquid does not contain any different surfactant other than the amphoteric surfactant having the betaine structure and the silicone surfactant. The different surfactant may reduce the cleaning performance of the cleaning liquid due to phenomena such as separation from the cleaning liquid. A ratio of the total content of the amphoteric surfactant having the betaine structure and the silicone surfactant to the surfactants contained in the cleaning liquid is preferably 90.0% by mass or more, more preferably 99.0% by mass or more, and even more preferably 100.0% by mass or more.

(Additives)

The cleaning liquid may further contain known additives (for example, a dissolution stabilizer, a drying inhibitor, an antioxidant, a viscosity modifier, a pH adjuster, and a fungicide) as necessary.

(Method of Manufacturing Cleaning Liquid)

For example, the cleaning liquid can be produced by mixing water, a water-soluble organic solvent, an amphoteric surfactant having a betaine structure, a silicone surfactant, and components added as needed.

Second Embodiment: Inkjet Recording Apparatus

An inkjet recording apparatus according to a second embodiment of the present disclosure includes a cleaning liquid, a recording head that includes an ink-ejecting surface and ejects ink from the ink-ejecting surface, a cleaning-liquid-supplying section, and a wipe blade. The cleaning liquid contains water, a water-soluble organic solvent, an amphoteric surfactant having a betaine structure, and a silicone surfactant. The viscosity of the cleaning liquid is 1.0 mPa·s or more and 3.1 mPa·s or less. The static surface tension of the cleaning liquid is 10 mN/m or more and 25 mN/m or less. The cleaning-liquid-supplying section supplies the cleaning liquid to the ink-ejecting surface of the recording head. The wipe blade performs a wipe operation of wiping twice the ink-ejecting surface, to which the cleaning liquid has been supplied, of the recording head. The first wiping speed in the wiping operation is 5 mm/sec or more and 25 mm/sec or less. The second wiping speed in the wiping operation is 45 mm/sec or more and 100 mm/sec or less.

Preferably, the wipe blade further performs a preliminary wiping operation of wiping the ink-ejecting surface of the recording head before the cleaning liquid is supplied. The wiping speed in the preliminary wiping operation is preferably 45 mm/sec or more and 100 mm/sec or less.

The details of the inkjet recording apparatus according to the present embodiment can be the same as, for example, the inkjet recording apparatus described in FIGS. 1 to 3 of the first embodiment. Further, the cleaning liquid included in the inkjet recording apparatus according to the present embodiment can be the same as the cleaning liquid described in the first embodiment. Therefore, redundant description will be omitted.

EXAMPLES

Examples of the present disclosure will be described below. However, the present disclosure is not limited to the following examples.

Measurement of Viscosity

Viscosity was measured at 25° C. according to the method described in JIS (Japanese Industrial Standards) Z8803:2011 "Liquid viscosity measuring method", using a falling ball automatic micro-viscosity meter ("AMVn" manufactured by Anton Paar GMBH).

Measurement of Surface Tension

Static surface tension was measured at 25° C. according to the Wilhelmy plate method, using a surface tension meter ("Automatic surface tension meter DY-300" manufactured by Kyowa Interface Science Co., Ltd).

Surfactant

The following surfactants were used to prepare the cleaning liquid:

- Betaine amphoteric surfactant (SB-1) (Amphoteric surfactant with betaine structure): "AMOGEN (registered Japanese trademark) CBH" manufactured by Daiichi Kogyo Seiyaku Co., Ltd;
- Betaine amphoteric surfactant (SB-2) (Amphoteric surfactant with betaine structure): "SOFTAZOLINE (registered Japanese trademark) CPB" manufactured by Kawaken Fine Chemicals Co., Ltd;
- Silicone surfactant (SS-1): "SILFACE (registered Japanese trademark) SAG002" manufactured by Nissin Chemical Industry Co., Ltd;
- Silicone surfactant (SS-2): "SILFACE (registered Japanese trademark) SAG503A" manufactured by Nissin Chemical Industry Co., Ltd;
- Acetylene surfactant (SA-1): "OLFINE (registered Japanese trademark) EXP4300" manufactured by Nissin Chemical Industry Co., Ltd; and
- Acetylene surfactant (SA-2): "OLFINE (registered Japanese trademark) EXP4001" manufactured by Nissin Chemical Industry Co., Ltd.

Ink

Using an agitator ("Three One Motor BL-600" manufactured by Shinto Kagaku Co., Ltd), 40.0 parts by mass of pigment-dispersed liquid, 3.0 parts by mass of binder-particle-dispersed liquid, 10.0 parts by mass of glycerin, 20.0 parts by mass of triethylene glycol monobutyl ether, 5.0 parts by mass of 2-pyrrolidone, 2.5 parts by mass of acetylene surfactant ("SURFYNOL (registered trademark) 440" manufactured by Nissin Chemical Industry Co., Ltd), 19.5 parts by mass of water were thoroughly mixed. In this way, ink used for evaluation was prepared. Note that "EMACOL SF BLACK AH2186F" manufactured by Sanyo Color Works, LTD (Pigment: C.I. Pigment Black 7, dispersion medium: water, pigment concentration: 20% by mass) was used as the pigment-dispersed liquid. "Movinyl 6763" manufactured by Japan Coating Resin Co., Ltd (binder-particle-dispersed liquid containing urethane-acrylic resin, solid content concentration: 40% by mass) was used as the binder-particle-dispersed liquid.

Preparation of Cleaning Liquid

Cleaning liquids (C-1) to (C-15) were prepared by the following method.

The cleaning liquid (C-1) was obtained by thoroughly mixing 20.0 parts by mass of glycerin, 2.5 parts by mass of betaine amphoteric surfactant (SB-1), 0.5 parts by mass of silicone surfactant (SS-1), and 77.0 parts by mass of ion-exchanged water (total amount 100 parts by mass).

The cleaning liquids (C-2) to (C-15) were prepared in the same manner as the preparation of the cleaning liquid (C-1), except that the types and additive amounts of raw materials used were changed as depicted in Tables 1 and 2 below. Note that "TGME"" in Tables 1 and 2 indicates triethylene glycol monobutyl ether. The viscosity and static surface tension of each of the cleaning liquids (C-1) to (C-15) were then measured. The measurement results are depicted in Tables 1 and 2. The "surface tension" in Tables 1 and 2 indicates static surface tension.

TABLE 1

| Cleaning liquid | | C-1 | C-2 | C-3 | C-4 | C-5 | C-6 | C-7 | C-8 |
|---|---|---|---|---|---|---|---|---|---|
| Organic solvent [parts by mass] | Glycerin | 20.0 | — | — | 30.0 | 10.0 | — | 40.0 | 20.0 |
| | Propylene glycol | — | 20.0 | — | — | 10.0 | — | — | — |
| | 1,3-propandiol | — | — | 20.0 | — | — | — | — | — |
| | TGME | — | — | — | — | — | 20.0 | — | — |
| Surfactant [parts by mass] | SB-1 | 2.5 | 2.5 | 2.5 | 2.5 | 2.5 | 2.5 | 2.5 | 2.5 |
| | SB-2 | — | — | — | — | — | — | — | — |
| | SS-1 | 0.5 | 0.5 | 0.5 | 0.5 | 0.5 | 0.5 | 0.5 | — |
| | SS-2 | — | — | — | — | — | — | — | — |
| | SA-1 | — | — | — | — | — | — | — | 0.5 |
| | SA-2 | — | — | — | — | — | — | — | — |
| Ion-exchanged water | | Remainder | | | | | | | |
| Total [parts by mass] | | 100.0 | | | | | | | |
| Physical property | Viscosity [mPa · s] | 1.9 | 1.8 | 1.8 | 3.0 | 1.9 | 2.9 | 3.2 | 1.9 |
| | Surface tension [mN/m] | 22 | 23 | 23 | 23 | 22 | 29 | 23 | 28 |

TABLE 2

| Cleaning liquid | | C-9 | C-10 | C-11 | C-12 | C-13 | C-14 | C-15 |
|---|---|---|---|---|---|---|---|---|
| Organic solvent [parts by mass] | Glycerin | 20.0 | 20.0 | 20.0 | 20.0 | 20.0 | 20.0 | 20.0 |
| | Propylene glycol | — | — | — | — | — | — | — |
| | 1,3-propandiol | — | — | — | — | — | — | — |
| | TGME | — | — | — | — | — | — | — |
| Surfactant [parts by mass] | SB-1 | — | — | 2.5 | — | 0.5 | 2.5 | 2.5 |
| | SB-2 | — | 2.5 | — | — | — | — | — |
| | SS-1 | 0.5 | 0.5 | — | 0.5 | 0.5 | 0.1 | 1.0 |
| | SS-2 | — | — | 0.5 | — | — | — | — |
| | SA-1 | 2.5 | — | — | — | — | — | — |
| | SA-2 | — | — | — | 2.5 | — | — | — |
| Ion-exchanged water | | Remainder | | | | | | |
| Total [parts by mass] | | 100.0 | | | | | | |
| Physical property | Viscosity [mPa · s] | — | 2.0 | 1.9 | — | 1.9 | 1.9 | 1.9 |
| | Surface tension [mN/m] | — | 22 | 24 | — | 22 | 23 | 21 |

Note that the physical properties of the cleaning liquids (C-9) and (C-12) could not be measured because the surfactant was separated from the solvent (water and water-soluble organic solvent).

Evaluation

The cleaning methods of Examples 1 to 13 and Comparative Examples 1 to 8 using cleaning liquids (C-1) to (C-15) were carried out in the following manner. The cleaning performance and the influence on the ejection performance of the recording head were evaluated. The evaluation results are depicted in Tables 3 to 5 below. Unless otherwise specified, each evaluation was performed under a normal temperature and normal humidity environment (temperature: 25° C., humidity: 50% RH environment).

Cleaning Performance

A plate including an ink-ejecting surface was removed from a recording head (KJ4B-1200 manufactured by KYOCERA Corporation). The plate was used as an evaluation plate. The above-mentioned ink was ejected onto the ink-ejecting surface of the evaluation plate using another recording head (KJ4B-1200 manufactured by KYOCERA Corporation) to form a lattice dot pattern (1000 dots). In forming the dot pattern, the volume per ink droplet was set to 15 pL (15 pL of ink forms one dot). The evaluation plate was then dried at 40° C. for 72 hours. The evaluation plate is a sample that simulates a state in which dried ink adheres as dirt to the ink-ejecting surface of a recording head.

The above evaluation plate was supplied with 0.1 mL of a cleaning liquid depicted in Tables 3 to 5 (specifically, each of the cleaning liquids (C-1) to (C-15)) (Supply amount per unit area: 2.5 μL/cm$^2$). The evaluation plate was then wiped (first time) at a wiping speed A depicted in Tables 3 to 5 using a rubber wipe blade (Linear pressure: 10 N/m). The evaluation plate was then wiped (second time) at a wiping speed B depicted in Tables 3 to 5 using the above-mentioned wipe blade (Linear pressure: 10 N/m).

The ink-ejecting surface of the evaluation plate after wiping twice was observed, and the number of remaining dots was counted. The dot removal rate (100×{1000−number of remaining dots}/1000) was then calculated. The dot removal rate was taken as the evaluation value of cleaning performance. The cleaning performance was judged based on the following criteria.

Criteria for Cleaning Performance

A(Good): Removal rate is over 90.0%.

B(Poor): Removal rate is 70.0% or more and less than 90.0%.

C(Very poor): Removal rate less than 70.0%.

Influence on Ejection Performance

A lattice dot pattern (Number of dots: 10 (vertical)×100 (horizontal)) was formed by using a recording head (KJ4B-1200 manufactured by Kyocera Corporation) to eject ink drop by drop from the nozzle onto the printing paper (stamp printing). As a result, a first evaluation image was obtained. The plate including the ink-ejecting surface was then removed from the recording head described above.

The above evaluation plate was supplied with 0.1 mL of a cleaning liquid depicted in Tables 3 to 5 (specifically, each of the cleaning liquids (C-1) to (C-15)) (Supply amount per unit area: 2.5 μL/cm$^2$). The evaluation plate was then wiped (first time) at a wiping speed A depicted in Tables 3 to 5 using a rubber wipe blade (Linear pressure: 10 N/m). The evaluation plate was then wiped (second time) at a wiping speed B depicted in Tables 3 to 5 using the above-mentioned wipe blade (Linear pressure: 10 N/m).

The above evaluation plate was reattached to the above recording head. A lattice dot pattern (Number of dots: 10 (vertical)×100 (horizontal)) was formed by using the above recording head to eject ink drop by drop from the nozzle onto the printing paper (stamp printing). As a result, a second evaluation image was obtained.

An image analysis device was used to measure deviation amount Δx [μm] in horizontal direction (main scanning direction) and deviation amount Δy [μm] in vertical direction (sub scanning direction) for each dot of the first evaluation image and the second evaluation image to calculate their respective average values. Then, 3σx and 3σy were calculated based on the average values calculated. Then, 3σ [μm] which is the evaluation value of the dot misalignment was obtained by substituting each value into the formula "$3\sigma=\sqrt{\{(3\sigma x)^2+(3\sigma y)^2\}}=3\sqrt{(\sigma x^2+\sigma y^2)}$". Cleaning liquid to remain without being wiped after the second wiping causes reduction in the ejection performance of the recording head because the cleaning liquid remains adhered to the ink-ejecting surface of the recording head. The above-mentioned 3σ therefore indicates the influence of the cleaning method on the ejection performance of the recording head. The influence on the ejection performance was determined based on the following criteria.

Influence on Ejection Performance

A (Good): 3σ is 3.0 or less.

B (Poor): 3σ is over 3.0.

Note that comparative examples of cleaning liquids (C-9) and (C-12) could not be evaluated because the surfactant was separated from the solvent (water and water-soluble organic solvent).

TABLE 3

| | | Examples | | | | | | |
|---|---|---|---|---|---|---|---|---|
| | | 1 | 2 | 3 | 4 | 5 | 6 | 7 |
| Cleaning liquid | | C-1 | C-2 | C-3 | C-4 | C-5 | C-1 | C-1 |
| Wiping speed A[mm/s] | | 20 | 20 | 20 | 20 | 20 | 10 | 20 |
| Wiping speed B[mm/s] | | 50 | 50 | 50 | 50 | 50 | 50 | 60 |
| Cleaning perfor-mance | Rating | A | A | A | A | A | A | A |
| | Removal Rate [%] | 94 | 92 | 92 | 90 | 92 | 97 | 95 |
| Ejection perfor-mance | Rating | A | A | A | A | A | A | A |
| | 3σ | 2.3 | 2.1 | 2.2 | 2.6 | 2.5 | 2.3 | 2.0 |

TABLE 4

| | | Examples | | | | | |
|---|---|---|---|---|---|---|---|
| | | 8 | 9 | 10 | 11 | 12 | 13 |
| Cleaning liquid | | C-1 | C-10 | C-11 | C-13 | C-14 | C-15 |
| Wiping speed A[mm/s] | | 10 | 20 | 20 | 20 | 20 | 20 |
| Wiping speed B[mm/s] | | 60 | 50 | 50 | 50 | 50 | 50 |
| Cleaning performance | Rating | A | A | A | A | A | A |
| | Removal Rate [%] | 96 | 93 | 92 | 91 | 91 | 97 |
| Ejection performance | Rating | A | A | A | A | A | A |
| | 3σ | 1.9 | 2.5 | 2.2 | 2.2 | 1.8 | 2.8 |

TABLE 5

| | | Comparative Examples | | | | | | | |
|---|---|---|---|---|---|---|---|---|---|
| | | 1 | 2 | 3 | 4 | 5 | 6 | 7 | 8 |
| Cleaning liquid | | C-1 | C-1 | C-1 | C-6 | C-7 | C-8 | C-9 | C-12 |
| Wiping speed A[mm/s] | | 30 | 50 | 20 | 20 | 20 | 20 | — | — |
| Wiping speed B[mm/s] | | 50 | 50 | 20 | 50 | 50 | 50 | — | — |
| Cleaning performance | Rating | B | C | A | C | A | C | — | — |
| | Removal Rate [%] | 84 | 66 | 92 | 42 | 91 | 59 | — | — |
| Ejection performance | Rating | A | A | B | A | B | A | — | — |
| | 3σ | 2.2 | 2.0 | 3.8 | 2.5 | 3.4 | 1.5 | — | — |

Each cleaning method of Examples 1 to 13 is a method of cleaning a recording head that includes an ink-ejecting surface and ejects ink from the ink-ejecting surface. The cleaning method included a cleaning-liquid-supplying step of supplying a cleaning liquid to the ink-ejecting surface of the recording head, and a wiping step of wiping twice the ink-ejecting surface of the recording head with a wipe blade after the cleaning-liquid-supplying step. A first wiping speed in the wiping step was 5 mm/sec or more and 25 mm/sec or less. A second wiping speed in the wiping step was 45 mm/sec or more and 100 mm/sec or less. The cleaning liquid contained water, a water-soluble organic solvent, an amphoteric surfactant having a betaine structure, and a silicone surfactant. The viscosity of the cleaning liquid was 1.0 mPa·s or more and 3.1 mPa·s or less. The static surface tension of the cleaning liquid was 10 mN/m or more and 25 mN/m or less. The respective cleaning methods of Examples 1 to 13 were in excellent cleaning performance and could suppress the influence on ejection performance.

In respective cleaning methods of Comparative Examples 1 and 2, the first wiping speed A was too fast. It is therefore determined that the cleaning liquid could not remain partially without being wiped on the ink-ejecting surface of the recording head during first wiping. As a result, the cleaning methods of Comparative Examples 1 and 2 had poor cleaning performance.

In the cleaning method of Comparative Example 3, the second wiping speed B was too slow. It is therefore determined that the cleaning liquid could not be completely removed from the ink-ejecting surface of the recording head during the second wiping. As a result, in the cleaning method of Comparative Example 3, the ejection performance decreased after cleaning.

In the cleaning method of Comparative Example 4, the static surface tension of the cleaning liquid was excessive. It is therefore determined that the cleaning liquid could hardly penetrate the resin component adhering to the ink-ejecting surface after the first wiping. As a result, the cleaning method of Comparative Example 4 had poor cleaning performance.

In the cleaning method of Comparative Example 5, the viscosity of the cleaning liquid was excessive. It is therefore determined that the cleaning liquid could not be completely removed from the ink-ejecting surface of the recording head during the second wiping. As a result, in the cleaning method of Comparative Example 5, the ejection performance decreased after cleaning.

In the cleaning method of Comparative Example 6, the cleaning liquid had an excessive static surface tension and did not contain a silicone surfactant. It is therefore determined that the cleaning liquid could hardly penetrate the resin component adhering to the ink-ejecting surface after the first wiping. As a result, the cleaning method of Comparative Example 6 had poor cleaning performance.

What is claimed is:

1. A cleaning method for a recording head that includes an ink-ejecting surface and ejects ink from the ink-ejecting surface, comprising:

supplying a cleaning liquid to the ink-ejecting surface of the recording head; and wiping the ink-ejecting surface of the recording head twice with a wipe blade after the supplying a cleaning liquid, wherein a first wiping speed in the wiping is 5 mm/sec or more and 25 mm/sec or less, a second wiping speed in the wiping is 45 mm/sec or more and 100 mm/sec or less, and the cleaning liquid contains water, a water-soluble organic solvent, an amphoteric surfactant having a betaine structure, and a silicone surfactant, viscosity of the cleaning liquid being 1.0 mPa·s or more and 3.1 mPa·s or less, static surface tension of the cleaning liquid being 10 mN/m or more and 25 mN/m or less.

2. The cleaning method according to claim 1, wherein a ratio of an amount of the water-soluble organic solvent to the cleaning liquid is 10.0% by mass or more and 35.0% by mass or less.

3. The cleaning method according to claim 1, wherein the water-soluble organic solvent contains a polyhydric alcohol.

4. The cleaning method according to claim 3, wherein the polyhydric alcohol contains glycerin, propylene glycol, or 1,3-propanediol.

5. The cleaning method according to claim 1, wherein the amphoteric surfactant has an amidoalkyl betaine structure.

6. The cleaning method according to claim 1, wherein a ratio of an amount of the amphoteric surfactant to the cleaning liquid is 0.3% by mass or more and 3.0% by mass or less.

7. The cleaning method according to claim 1, wherein a ratio of an amount of the silicone surfactant to the cleaning liquid is 0.05% by mass or more and 1.5% by mass or less.

8. The cleaning method according to claim 1, further comprising wiping the ink-ejecting surface of the recording head with the wipe blade before supplying the cleaning liquid, wherein a wiping speed in the wiping before supplying the cleaning liquid is 45 mm/sec or more and 100 mm/sec or less.

* * * * *